Figure 5:
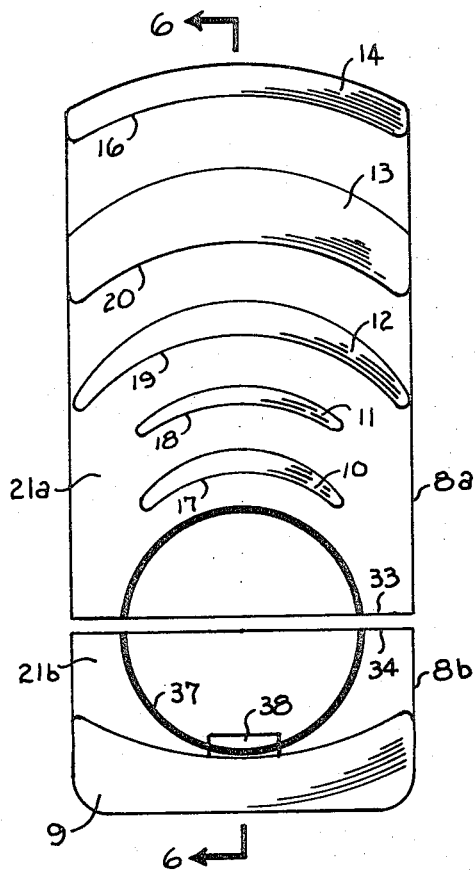

United States Patent [19]
Bjalme

[11] 3,807,258
[45] Apr. 30, 1974

[54] TOOL FOR CHAMFERING PLASTIC PIPE
[75] Inventor: Bengt G. Bjalme, Erie, Pa.
[73] Assignee: Reed Manufacturing Company, Erie, Pa.
[22] Filed: Oct. 23, 1972
[21] Appl. No.: 300,454

[52] U.S. Cl............................ 82/4 C, 30/93, 30/293, 408/81, 408/200
[51] Int. Cl................................................ B23b 5/16
[58] Field of Search....... 82/4 C, 4 R, 1 R; 30/93 X, 30/286, 293 X; 408/80, 81 X, 200 X, 202

[56] References Cited
UNITED STATES PATENTS
| | | | |
|---|---|---|---|
| 3,595,107 | 7/1971 | Dackow | 82/4 C |
| 3,131,599 | 5/1964 | MacFarlane et al. | 82/4 C |
| 3,603,182 | 9/1971 | Jackman | 82/4 C |

Primary Examiner—Leonidas Vlachos
Attorney, Agent, or Firm—Ralph Hammar

[57] ABSTRACT
A tool for chamfering the outer corners of several sizes of plastic pipe in preparation for solvent cement coupling.

10 Claims, 8 Drawing Figures

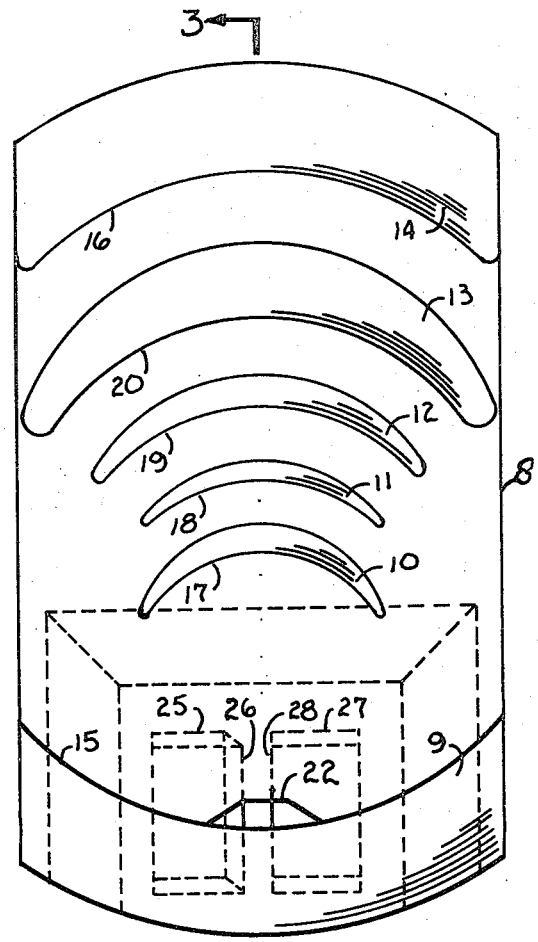
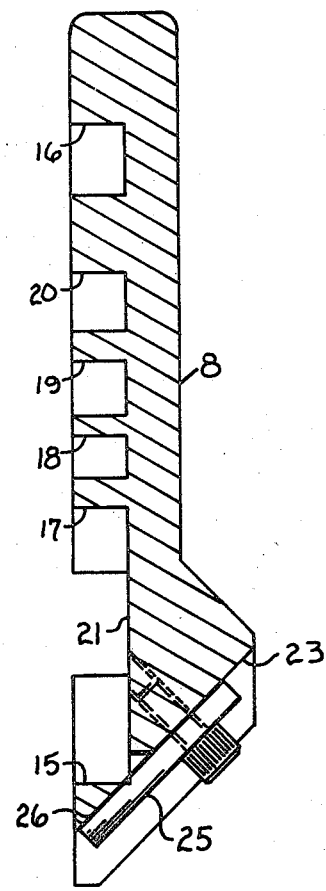
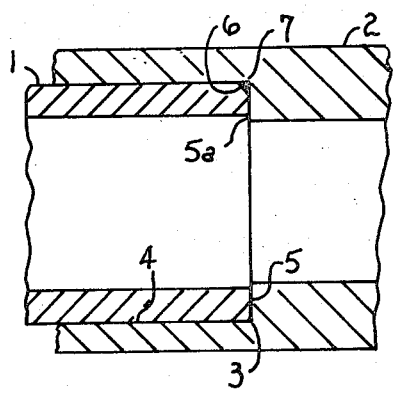
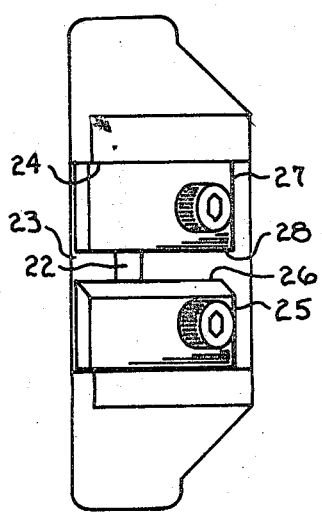
FIG. 2
FIG. 3
FIG. 1
FIG. 4

TOOL FOR CHAMFERING PLASTIC PIPE

This invention is intended to produce a controlled chamfer on the outer corner of a plastic pipe end in preparation for solvent coupling. The tool has guides for a plurality of pipe diameters with a single cutting blade positioned to make the chamfer on any of the pipe sizes.

Figure 6:
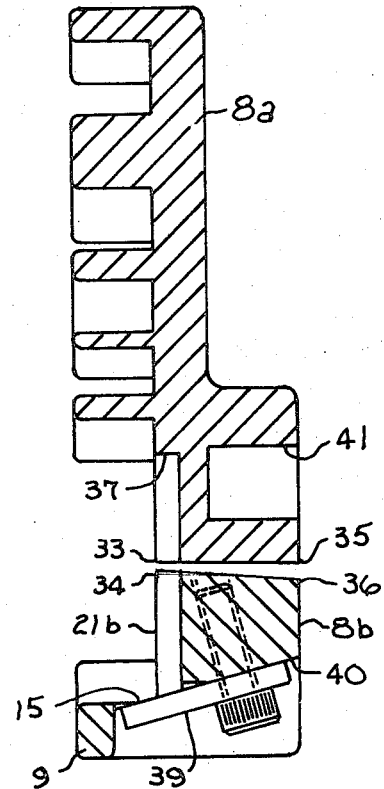
Figure 7:
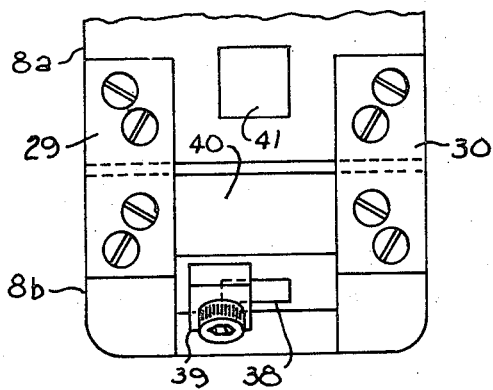
Figure 8:
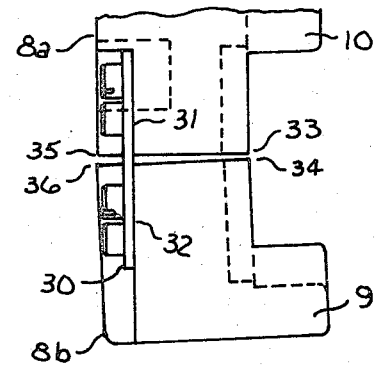

In the drawing,

FIG. 1 is a section through a solvent joint,
FIG. 2 is a plan view of the tool,
FIG. 3 is a section on line 3—3 of FIG. 2,
FIG. 4 is an end view of the tool,
FIG. 5 is a front view of a modification,
FIG. 6 is a section on line 6—6 of FIG. 5,
FIG. 7 is a back view and
FIG. 8 is a fragmentary edge view.

In making solvent joints, a pipe end 1 is telescoped into a sleeve coupling 2 after first coating the outer surface of the pipe end and inner surface of the sleeve with a solvent for the plastic. During insertion, if the pipe end has a square outer corner as shown at 3, there is a tendency for the solvent to be scraped off the inner surface 4 of the sleeve and to be pushed ahead of the pipe end as it is inserted so that upon reaching the final position, there is inadequate solvent remaining to provide a good bond between the surfaces 1, 4. If the sharp outer corner is provided with a narrow chamfer as indicated by the reference numeral 6, the space between the chamfer and the corner 7 of the coupling becomes solidly filled with solvent which is available for effecting a pressure tight seal between the surfaces 5, 5a. Also, the chamfer has less tendency to scrape the solvent from the inner surface 4 of the coupling sleeve. In the completed joint, the mechanical strength is obtained from the bond between surfaces 1, 4 and the pressure tight seal is obtained from the solvent in the space between the chamfer 6 and corner 7. The bond between surfaces 1, 4 is not, and does not need to be, pressure tight.

The tool shown in FIGS. 2, 3 and 4 provides the chamfer 6 needed for pressure tight joints. The tool comprises a block 8, usually of metal such as aluminum having outstanding from one face an arcuate rib 9 which cooperates with a series of arcuate ribs 10, 11, 12, 13 and 14 to guide different sizes of plastic pipe. The guide 9 is common to all pipe sizes, all being tangent at 29. Each of the guides 10–14 is unique to a single pipe size. In the tool illustrated, the ribs 9 and 14 have coaxial semicylindrical surfaces 15 and 16 each engaging about one-fourth of the circumference of opposite sides of the largest size pipe. The bearing between the pipe and the surfaces 15, 16 is adequate to guide the pipe for rotation about a fixed axis centered on line 3—3. Other pipe sizes guided by the ribs 10, 11, 12 and 13 make only point contact with the surface 15 but the angular extent of the semicylindrical surfaces 17–20 of the ribs 10–13 is adequate to maintain the axis of the other pipe sizes centered on line 3—3.

At the intersection of the surface 15 with a planar surface 21 from which the ribs 9–14 outstand is a narrow slot 22 in front of the intersection of a plane 23 with the surfaces 15 and 21. The angle of the plane 23 is the angle of the desired bevel or chamfer 6 (45° for the particular tool illustrated). The width of the intersection of the plane 23 with the surfaces 15, 21 is equal to the width of the desired bevel (three thirty-seconds inch for the particular tool shown). The added width of the slot 22 in front of the intersection provides chip clearance. Since the plane 23 is at the bottom of a groove 24, the dimensions of the intersection with the surfaces 15, 21 are easily controlled. Suitably fixed to the plane 23 at the bottom of the groove 24 is a cutting bit 25 having a cutting edge 26 intersecting the slot 22. Also secured to the bottom of the groove 24 is a guide member 27 having a flat surface 28 intersecting the slot 22. The flat surface 28 positively limits the depth of cut taken by the cutting edge 26. The guide member 27 in practice is not necessary. The planar surface 21 alone provides a sufficient control of the depth of cut.

In use, the pipe end is cut with a square end surface 5 and sharp outer corner 3. The square end surface is required to make a tight seal with the shoulder 5a on the coupling. The tool is then applied on the square pipe end with one side of the pipe end bearing against the surface 15 on the rim 9 and the opposite side of the pipe end bearing on the appropriate surface 16–20 corresponding to the pipe size. The square end surface 5 of the pipe is held tightly against the planar surface 21 and the required bevel is placed on the sharp corner 3 of the pipe by 360° relative rotation in the direction to advance the cutting edge 26 into the sharp corner of the pipe.

In the modification shown in FIGS. 5 through 8 inclusive, several features have been added. First, the body 8 is made in two sections hinged together with a spring hinge so the tool will grip the outer surface of the pipe and will not slip off once it is placed on the pipe. Second, an additional recess has been added to accommodate a pipe of smaller diameter. Third, the bevel angle of the chamfer has been changed from 45° to 15° to improve the joint between the pipe and coupling. Fourth, a wrench socket has been added to facilitate turning. Except for these features, the tools are substantially the same and common parts are indicated by the same reference numerals.

In the modification, the body comprises upper and lower parts 8a and 8b, usually aluminum die castings. The lower part 8b has the common arcuate rib 9 outstanding from its front face 21b. The upper part 8a has the arcuate ribs 10, 11, 12, 13 and 14 outstanding from its front face 21a. The faces 21a, 21b correspond to the face 21 of the previously described tool and together function as a single substantially planar surface. The parts 8a and 8b are hinged together by strip springs 29, 30 screwed to seats 31, 32 on the parts 8a, 8b. In the unstressed position of the springs 29, 30 shown in FIG. 8, the front edges 33, 34 of the bodies are closer together than the back edges of the bodies so that the gripping surfaces of the ribs 9–14 are hinged toward each other and are closer together than the outer surface of the pipe. When the tool is mounted on the pipe, the gripping surfaces of the ribs are forced apart, developing a tension in the strip springs 29, 30 which maintains a grip between the tool and the pipe. This means that when the tool is placed on the pipe, it hugs the pipe and will remain in place and will not fall off. This is a great convenience when the tool is being manually rotated relative to the pipe which usually requires that the manual grip on the tool be changed several times during the operation. If the tool were loose on the pipe, it might drop off or shift its position as the grip was changed. The spring action also forces the cutting tool to stay fully engaged with the periphery of the pipe providing a constant depth of cut and closely controlled width of chamfer in spite of variations in pipe diameter. For example, when chamfering the largest size pipe whose outside diameter is to small limits, cutting forces will urge the pipe into contact with surface 16 and away from contact with surface 15. The spring hinge 29, 30 forces the pipe into contact with surface 15, insuring a constant width bevel around the circumference of the pipe end. The strip springs 29, 30 in addition to providing the gripping force on the pipe also provide the mechanical connection between the parts 8a, 8b. The gripping force is determined by the relative angle between the seats 31, 32 and the springs 29, 30 in their unstressed condition. The springs could initially be flat as shown in FIG. 8, in which case the required unstressed position of the parts 8a, 8b would be obtained by inclination of the seats 31, 32. Alternatively, the seats 31, 32 could be in a common plane and the springs initially formed so that in the unstressed condition opposite ends of the springs were inclined. In either case, in the unstressed condition the springs compell movement to the FIG. 8 position.

For a size of pipe smaller than that accommodated by the ribs 9, 10, a socket 37 is provided slightly in front of the arcuate rib 9 and extending below the surfaces 21a, 21b. The section 38 of the socket adjacent the rib 9 is open to provide access to the same cutting blade which chamfers the larger sizes of pipe. Since one section of the socket 37 is located in part 8a and the remainder of the socket is located in part 8b, the strip springs 29, 30 provide the same gripping action on the smaller size pipe inserted in the socket 37. In the particular tool shown, the socket 37 accommodates 1¼-inch pipe while the ribs 9-14 accommodate 1½-inch 2-inch, 2½-inch, 3-inch and 4-inch pipe.

The chamfer 6 is provided by a bit 39 fastened to a planar surface 40 inclined to the axis of the pipe at a chamfer angle of 15°. The 15° chamfer angle decreases the tendency of the chamfer to scrape solvent from the coupling and improves the strength of the joint. As is apparent from FIG. 6, the cutting edge of the bit 39 intersects the surfaces 15 and 21b at the chamfer angle and also intersects the corresponding surfaces of the socket 37 at the same chamfer angle. This is possible because the socket 37 is in front of the rib 9.

As an added convenience, the part 8a is provided with a wrench socket 41 by which the tool may be turned relative to the pipe for chamfering.

The use of the tool is the same as the previously described construction. The tool is first mounted on the pipe end to be chamfered and the chamfer is completed by one full revolution of the tool relative to the pipe.

What is claimed is:

1. A tool for bevelling the outside corner formed by the intersection of the end and outside peripheral surfaces of a pipe end comprising a body extending diametrically across and having a planar surface engaging the end surface of the pipe end and positioning said end surface in a plane normal to the axis of the pipe, said body having guide means fixed to said body and outstanding from said planar surface and engaging the outside peripheral surface adjacent the end surface of the pipe end for holding the axis of the pipe end in fixed relation to said body during relative rotation of the body and pipe end, and a cutter fixed to said body having an edge intersecting the outside corner of the pipe end at the width and angle of the desired bevel.

2. A tool for bevelling the outside corner formed by the intersection of the end and peripheral surfaces of a pipe end comprising a body extending diametrically across and having a planar surface engaging the end surface of the pipe end and positioning said end surface in a plane normal to the axis of the pipe, guide means engaging the peripheral surface adjacent the end surface of the pipe end for holding the axis of the pipe end in fixed relation to said body during relative rotation of the body and pipe end, said guide means comprising ribs on said body outstanding from said planar surface and having surfaces engaging said peripheral surfaces of the pipe end on opposite sides of the axis of the pipe and a cutter supported on said body having an edge intersecting the outside corner of the pipe end at the width and angle of the desired bevel.

3. A tool for bevelling the outside corner formed by the intersection of the end and peripheral surfaces of a pipe end comprising a body extending diametrically across and having a planar surface engaging the end surface of the pipe end and positioning said end surface in a plane normal to the axis of the pipe, guide means engaging the peripheral surface adjacent the end surface of the pipe end for holding the axis of the pipe end in fixed relation to said body during relative rotation of the body and pipe end, said body having a plurality of sets of guide means, each set having a plurality of guide means and each set being unique to a different pipe size and one guide means being common to a plurality of sets and a cutter supported on said body having an edge intersecting the outside corner of the pipe end at the width and angle of the desired bevel.

4. The tool of claim 3 in which the cutter edge is positioned at said one guide means.

5. A tool for bevelling the outside corner formed by the intersection of the end and peripheral surfaces of a pipe end comprising a body extending diametrically across and having a planar surface engaging the end surface of the pipe end and positioning said end surface in a plane normal to the axis of the pipe, guide means engaging the peripheral surface adjacent the end surface of the pipe end for holding the axis of the pipe end in fixed relation to said body during relative rotation of the body and pipe end, said body comprising two sections each having part of said planar surface and said sections being connected by spring hinge means, and a cutter supported on said body having an edge intersecting the outside corner of the pipe end at the width and angle of the desired bevel.

6. The tool of claim 5 in which the guide means comprises ribs on said sections.

7. The tool of claim 5 in which the body has a plurality of sets of guide means, each set having a plurality of guide means and each set being unique to a different pipe size and one guide means being common to a plurality of sets.

8. The tool of claim 5 in which the cutter edge is positioned at said one guide means.

9. The tool of claim 1 in which the guide means comprise a plurality of means circumferentially spaced from each other which are centered on the diametral axis of the pipe end and engage said peripheral surface on opposite sides of the axis of the pipe end.

10. A tool for bevelling the outside corner formed by the intersection of the end and peripheral surfaces of a pipe end comprising a body extending diametrically across and having a planar surface engaging the end surface of the pipe end and positioning said end surface in a plane normal to the axis of the pipe, guide means engaging the peripheral surface adjacent the end surface of the pipe end for holding the axis of the pipe end in fixed relation to said body during relative rotation of the body and pipe end, said guide means being centered on the diametral axis of the pipe end and engage said peripheral surface on opposite sides of the axis of the pipe end, the guide means on one side of the axis of the pipe end making point contact with said peripheral surface and a cutter supported on said body having an edge intersecting the outside corner of the pipe end at the width and angle of the desired bevel.

* * * * *